United States Patent [19]
Ishizumi et al.

[11] 3,925,382
[45] Dec. 9, 1975

[54] PROCESS FOR PREPARING QUINAZOLINE DERIVATIVES

[75] Inventors: Kikuo Ishizumi, Osaka; Kazuo Mori, Hyogo; Michihiro Yamamoto, Hyogo; Masao Koshiba, Hyogo; Shigeho Inaba, Hyogo; Hisao Yamamoto, Hyogo, all of Japan

[73] Assignee: Sumitomo Chemical Company, Limited, Osaka, Japan

[22] Filed: Mar. 23, 1973

[21] Appl. No.: 344,400

[30] Foreign Application Priority Data
Mar. 24, 1972 Japan.............................. 47-29984

[52] U.S. Cl. 260/251 QB; 260/319.1; 260/326.13 R; 260/326.16
[51] Int. Cl.² .................................... C07D 239/82
[58] Field of Search ............................. 260/251 QB

[56] References Cited
UNITED STATES PATENTS
3,712,892  1/1973  Inaba et al................... 260/251 QB Primary Examiner—Raymond V. Rush
Attorney, Agent, or Firm—Stevens, Davis, Miller & Mosher

[57] ABSTRACT

A process for preparing a pharmaceutically active quinazolinone derivative having the formula

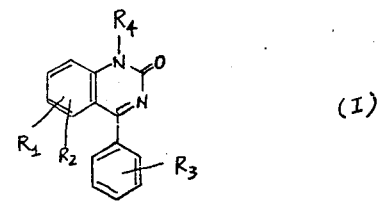

wherein $R_1$, $R_2$, $R_3$ and $R_4$ are as defined hereinafter, which comprises reacting a 2-aminoindole derivative with an oxidizing agent is disclosed. The 2-aminoindole derivative used in the novel process of this invention is prepared from the corresponding 2-acylaminoindole by hydrolysis or catalytic reduction or from the corresponding indole-2-isocyanate by hydrolysis.

7 Claims, No Drawings

PROCESS FOR PREPARING QUINAZOLINE DERIVATIVES

BACKGROUND OF THE INVENTION

1. Field of the Invention

This invention relates to a novel process for preparing quinazolinone derivatives. More particularly, the present invention relates to a novel process for preparing quinazolinone derivatives represented by the formula

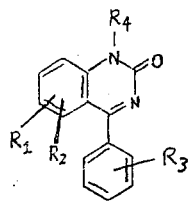

(I)

wherein $R_1$, $R_2$ and $R_3$ each represents a hydrogen atom, a halogen atom, a trifluoromethyl group, a nitro group, a lower alkyl group or a lower alkoxy group; and $R_4$ represents a hydrogen atom, an aralkyl group, a lower alkyl group, a polyhaloalkyl group, a lower alkanoyloxyalkyl group or a cycloalkylalkyl group.

2. Brief Description of the Prior Art

The well-known process for preparing the quinazolinone derivatives represented by the formula (I) above comprises a condensation reaction of an o-aminobenzophenone derivative represented by the formula (II)

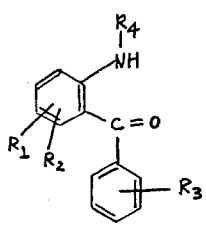

(II)

wherein $R_1$, $R_2$, $R_3$ and $R_4$ are as defined above, with, for example, an alkylcarbamate. However, most of the o-aminobenzophenone derivatives (II) used in the well-known process are difficult to produce. Further, since the preparation of the compounds (II) wherein $R_4$ represents a substitutent other than a hydrogen atom, such as an alkyl group, from the compound (II) wherein $R_4$ represents a hydrogen atom generally requires three-step reaction, the procedure using the compound (II) wherein $R_4$ represents a hydrogen atom as a starting material is not an advantageous process for the preparation of the quinazolinone derivatives recited in the present invention. In addition, the above known process is not advantageous in that the condensation reaction requires a heating at a high temperature in the presence of a catalyst and treatments subsequent to the condensation reaction are very cumbersome and difficult to conduct.

As a result of extended research for the synthesis of quinazolinone derivatives represented by the formula (I), it was found that quinazolinone derivatives can be prepared by a reaction which can easily be carried out from certain indole derivatives as starting materials in place of the o-aminobenzophenone derivatives used in conventional processes, without requiring severe reaction conditions associated with the use of o-aminobenzophenone. The indole derivatives used in the present invention can be prepared easily as described hereinafter in greater detail.

DETAILED DESCRIPTION OF THE INVENTION

The novel process of this invention can be illustrated by the following reaction scheme:

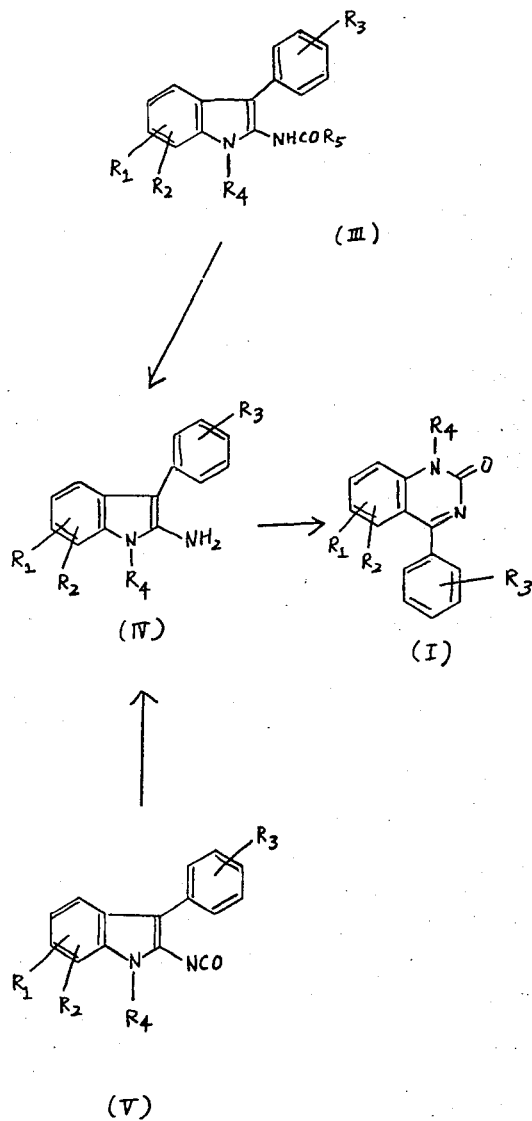

wherein $R_1$, $R_2$, $R_3$ and $R_4$ are as defined above, and $R_5$ represents a hydrogen atom, a lower alkyl group, a phenyl group, a lower alkoxy group or a benzyloxy group.

The process of this invention comprises reacting a 2-aminoindole derivative represented by the formula (IV) with an oxidizing agent to produce the corresponding quinazolinone derivative represented by the formula (I). The 2-aminoindole derivative of the formula (IV) can be prepared by open of two alternative procedures, i.e., (1) hydrolysis or catalytic reduction of a 2-acylaminoindole derivative represented by the formula (III) or (2) hydrolysis of a 2-indole-2-isocyanate derivative represented by the formula (V).

In the above alternative procedures, the indole derivative of the formula (III) used as a starting material in the method (1) can be prepared by reacting, for example, an azide derivative represented by the formula (VI)

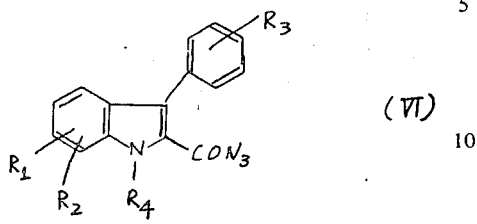

wherein $R_1$, $R_2$, $R_3$ and $R_4$ are as defined above, with an alcohol or alkanoic acid such as acetic acid.

The 2-acylaminoindole derivative of the formula (III) thus obtained can easily be converted into the corresponding 2-aminoindole derivative of the formula (IV) by catalytic reduction or hydrolysis. The conversion using a catalytic reduction is generally suitable for the compounds wherein R represents a benzyloxy group and can easily be carried out in the presence of a noble metal catalyst such as nickel, palladium, platinum, etc., commonly employed catalytic reduction or hydrogenation in a solvent such as alcohols, ethers, acetic acid, ethyl acetate, and the like which are conventionally used in catalytic reduction.

The above described hydrolysis can be effected by either an alkali hydrolysis or an acid hydrolysis, and a caustic alkali such as sodium hydroxide or potassium hydroxide or a mineral acid such as hydrochloric acid or sulfuric acid can preferably be used in the hydrolysis.

The indole-2-isocyanate derivative of the formula (V) used as a starting material in method (2) above can be prepared from an azido derivative represented by the formula (VI) by, for example, heating the azide derivative (VI) or allowing the azide derivative (VI) to stand for a long period of time at room temperature in the presence or absence of solvents.

The 2-aminoindole derivative of the formula (IV) thus obtained can then be reacted with an oxidizing agent to convert the 2-aminoindole derivative into the desired quinazolinone derivative represented by the formula (I). Suitable examples of the oxidizing agent used in the conversion of 2-aminoindole derivatives (IV) into the quinazolinone derivatives (I) include ozone, hydrogen peroxide, a peroxy acid, for example, performic acid, peracetic acid, perbenzoic acid and the like, chromic acid, halogens, hypohalites of sodium, potassium or calcium, etc., but the oxidizing agent used in the present invention is not limited to the specific examples described above. The reaction between the 2-aminoindole derivative (IV) and the oxidizing agent generally proceeds at room temperature in the presence of an inert solvent, but it may be conducted while cooling or heating a reaction mixture if necessary. The type of the solvent used in the above reaction varies depending upon the specific oxidizing agent used, but suitable examples of the inert solvent include water, chloroform, carbon tetrachloride, acetic acid, formic acid, acetone, alcohols, tetrahydrofuran and the like.

The quinazolinone derivatives represented by the formula (I) obtained in accordance with the process of this invention exhibit per se an anti-inflammatory activity are also useful as intermediates for the preparation of pharmacologically active agents such as anti-inflammatory agents and central nervous system depressants.

In accordance with the process of this invention, the following quinazolinone derivatives can be prepared, for example, 4-phenyl-2(1H)-quinazolinone,
4-phenyl-6-chloro-2(1H)-quinazolinone,
4-phenyl-6-bromo-2(1H)-quinazolinone,
4-phenyl-6-fluoro-2(1H)-quinazolinone,
4-phenyl-6-methyl-2-(1H)-quinazolinone,
4-phenyl-6-methoxy-2(1H)-quinazolinone,
4-phenyl-6-nitro-2(1H)-quinazolinone,
4-phenyl-6-trifluoromethyl-2(1H)-quinazolinone,
4-phenyl-6,8-dichloro-2(1H)-quinazolinone,
4-phenyl-6,7-dimethoxy-2(1H)-quinazolinone,
4-(o-chlorophenyl)-6-chloro-2(1H)-quinazolinone,
4-(o-chlorophenyl)-6-nitro-2(1H)-quinazolinone,
4-(o-fluorophenyl)-6-chloro-2(11H)-quinazolinone,
1-methyl-4-phenyl-2(1H)-quinazolinone,
1-methyl-4-phenyl-6-chloro-2(1H)-quinazolinone,
1-methyl-4-phenyl-6-iodo-2(1H)-quinazolinone,
1-methyl-4-phenyl-6-methoxy-2(1H)-quinazolinone,
1-methyl-4-phenyl-6-nitro-2(1H)-quinazolinone,
1-methyl-4-phenyl-6-trifluoromethyl-2(1H)-quinazolinone,
1-methyl-4-phenyl-6,8-dichloro-2(1H)-quinazolinone,
1,6-dimethyl-4-phenyl-2(1H)-quinazolione,
1,8-dimethyl-4-phenyl-6-chloro-2(1H)-qunazolinone, 1-ethyl-4-phenyl-6-nitro-2(1H)-quinazolinone,
1-ethyl-4-(o-tolyl)-6-chloro-2(1H)-quinazolinone,
1-methyl-4(o-fluorophenyl)-6-chloro-2(1H)-quinazolinone,
1-isopropyl-4-phenyl-6-chloro-2(1H)-quinazolinone,
1-isopropyl-4-phenyl-6-methoxy-2(1H)-quinazolinone,
1-isopropyl-4-phenyl-6-nitro-2(1H)-quinazolinone,
1-isopropyl-4-phenyl-6-trifluoromethyl-2(1H)-quinazolinone,
1-isobutyl-4-phenyl-6-chloro-2(1H)-quinazolinone,
1-n-butyl-4-phenyl-6-chloro-2(1H)-quinazolinone,
1-(2,2,2-trifluoroethyl)-4-phenyl-6-chloro-2(1H)-quinaolinone, C.
1-(2,2,3,3,3-pentafluoropropyl)-4-phenyl-6-chloro-2(1H)-quinazolinone,
1-cyclopropylmethyl-4-phenyl-6-chloro-2(1H)-quinazolinone,
1-cyclopropylmethyl-4-(o-tolyl)-6-chloro-2(1H)-quinazolinone,
1-cyclopropylmethyl-4-phenyl-6-nitro-2(1H)-quinazolinone,
1-cyclopropylmethyl-4-phenyl-6-trifluoromethyl-2(1H)-quinazolinone,
1-cyclopropylmethyl-4-phenyl-6-bromo-2(1H)-quinazolinone,
1-cyclopropylmethyl-4-phenyl-6,8-dichloro-2(1H)-quinazolinone,
1-cyclopropylmethyl-4-phenyl-6-methoxy-2(1H)-quinazolinone,
1-cyclopropylmethyl-4-(o-fluorophenyl)-6-chloro-2(1H)-quinazolinone,
1-cyclopropylmethyl-4-4-(m-chlorophenyl)-6-chloro-2(1H)-quinazolinone,
1-cyclopropylethyl-4-phenyl-6-chloro-2(1H)-quinazolinone,
1-cyclopropylmethyl-4-(o-chlorophenyl)-6-nitro-2(1H)-quinazolinone, 1-cyclohexylmethyl-4-phenyl-6-nitro-2(1H)-quinazolinone, 1-benzyl-4-phenyl-6-nitro-2(1H)-quniazolinone, 1-acetoxyethyl-4-phenyl-6-chloro-2(1H)-quinazolinone, and 1-acetoxyethyl-4-phenyl-6-nitro-2(1H)-quniazolinone.

The present invention is further illustrated by the following examples but they are not to be construed as limiting the scope of the present invention.

EXAMPLE 1

2.8 g of benzyl 1-methyl-3-phenyl-5-chloroindole-2-carbamate was dissolved in 70 ml of ethanol and, after 1 ml of concentrated hydrochloric acid was added to the solution, the mixture was catalytically reduced in the presence of 1.0 g of 5% palladium on carbon. After completion of the reduction, the mixture was filtered to remove the catalyst and the solvent was evaporated from the filtrate under reduced pressure. The resulting residue was dissolved in ethanol followed by addition of ethyl ether and the precipitated crystals were filtered to give 1.53 g of 1-methyl-2-amino-3-phenyl-5-chloroindole hydrochloride having a melting point of 254°–259°C (decomposition).

The above filtrate was concentrated under reduced pressure and the residue was recrystallized from ethanolacetone to give a second crop of crystals (4.3 g). The hydrochloride thus obtained was made neutral with aqueous ammonia and the resulting base was recrystallized from ethyl ether-pentane to give a free base, 1-methyl-2-amino-3-phenyl-5-chloroindole, having a melting point of 133°–136°C.

The starting material, benzyl 1-methyl-3-phenyl-5-chloroindole-2-carbamate, used in the above example was prepared as follows.

To a mixture of 30 ml of benzyl alcohol and 130 ml of toluene was added 15 g of 1-methyl-3-phenyl-5-chloroindole-2-carboxylic acid azide in small porportion while stirring and the mixture was refluxed for 30 minutes followed by being cooled. After undissolved precipitates were removed by filtration, the resulting toluene solution was concentrated under reduced pressure and then benzyl alcohol was removed by evaporation under reduced pressure. The residue was then chromatographed using 700 g of silica gel and chloroform as a developing solvent to give 8 g of benzyl 1-methyl-3-phenyl-5-chloroindole-2-carbamate. Recrystallization from ethanol yielded a product having a melting point of 163.5°–164.5°C.

EXAMPLE 2

5.0 g of 1-methyl-3-phenyl-5-chloroindole-2-isocyanate was suspended in 30 ml of benzene and, after 20 ml of a 50% aqueous solution of sodium hydroxide was added to the solution, the mixture was refluxed for 5 minutes. After allowing to cool, the mixture was separated into layers, and the aqueous layer was extracted with ethyl ether and combined with the benzene layer. The organic layer thus obtained was filtered to remove undissolved material, washed with water and dried over anhydrous sodium sulfate. The solvent was distilled under reduced pressure to give a residue having a melting point of 127°–132°C and the residue was washed with 5 ml of ethyl ether to give 3.03 g of 1-methyl-2-amino-3-phenyl-5-chloroindole having a melting point of 131°–135°C. From the mother liquor 0.35 g of crystals of the same product was obtained as a second crop.

The starting material, 1-methyl-3-phenyl-5-chlorindole-2-isocyanate, used in the above example was prepared as follows.

1-Methyl-3-phenyl-5-chloroindole-2-carboxylic acid azide was allowed to stand at room temperature in a desiccator for 40 days whereby the azido was quantatively converted into 1-methyl-3-phenyl-5-chloroindole-2-isocyanate. Determination of the melting point showed decomposition at 153°C but no significant change was observed and the product did not melt even above 300°C. In an alternative procedure, the above conversion was completed by heating the starting material in a solvent, e.g., benzene, for a period of several minutes.

EXAMPLE 3

1.0 G of 1-methyl-2-amino-3-phenyl-5-chloroindole was suspended in 30ml of carbon tetrachloride and a mixed gas of ozone-oxygen was introduced into the suspension at a temperature of -5°C. The reaction mixture turned into a orange-colored solution and thereafter crystals precipitated. The resulting crystals were filtered and placed on a column packed with 30 g of silica gel. Ethyl acetate as a solvent was then poured into the column to purify the crystals to obtain 1-methyl-4-phenyl-6-chloro-2(1H)-quinazolinone having a melting point of 221°–223°C.

EXAMPLE 4

0.85 G of potassium hydroxide was dissolved in 5 ml of water and 0.5 g of bromine was added to the solution at a temperature below 0°C. To the reaction mixture was added 0.64 g of 1-methyl-2-amino-3-phenyl-5-chloroindole, and the resulting mixture was stirred for 1 hour at 0° to 5°C, then for 3 hours at room temperature and finally for 2 hours at 65°C.

The reaction product was then washed with water and subsequently with ethyl ether. Recrystallization from isopropanol yielded 1-methyl-4-phenyl-6-chloro-2(1H)-quinazolinone having a melting point of 222°–223°C.

While the invention has been described in detail and with reference to specific embodiments thereof, it will be apparent to one skilled in the art that various changes and modification can be made therein without departing from the spirit and scope thereof.

What is claimed is:

1. A process for preparing a quinazolinone derivative represented by the formula

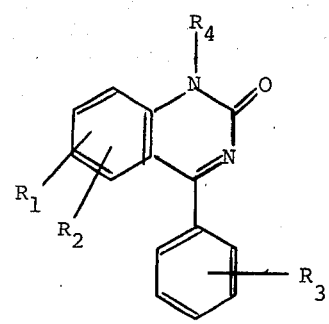

wherein $R_1$, $R_2$ and $R_3$ each represents a hydrogen atom, a halogen atom, trifluoromethyl, nitro, lower alkyl or lower alkoxy; and $R_4$ represents a hydrogen atom, benzyl, lower alkyl, 2,2,2-trifluoroethyl, 2,2,3,3,3-pentafluoropropyl or ($C_{3-6}$ cycloalkyl)$C_{1-2}$ alkyl, which comprises the step of reacting an aminoindole derivative represented by the formula

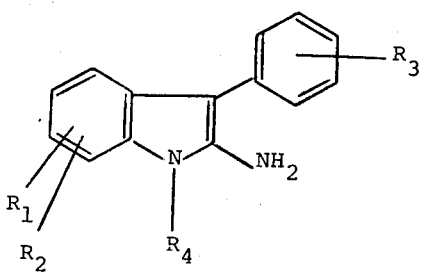

wherein $R_1$, $R_2$, $R_3$ and $R_4$ are as defined above, with an oxidizing agent selected from the group consisting of ozone and potassium hydroxide-bromine in the presence of an inert solvent.

2. A process according to claim 1 wherein said inert solvent is selected from the group consisting of water, chloroform, carbon tetrachloride, acetic acid, formic acid, acetone, tetrahydrofuran and alcohols.

3. A process for preparing a quinazolinone derivative represented by the formula

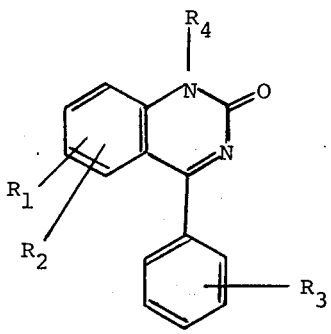

wherein $R_1$, $R_2$ and $R_3$ each represents a hydrogen atom, a halogen atom, trifluoromethyl, nitro, lower alkyl or lower alkoxy; and $R_4$ represents a hydrogen atom, benzyl, lower alkyl, 2,2,2-trifluoroethyl, 2,2,3,3,3,-pentafluoropropyl or ($C_{3-6}$ cycloalkyl)$C_{1-2}$ alkyl, which comprises the steps of subjecting a 2-acylaminoindole derivative represented by the formula

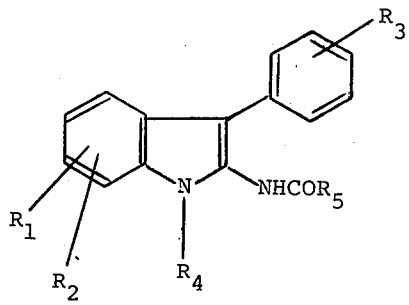

wherein $R_1$, $R_2$, $R_3$ and $R_4$ are as defined above and $R_5$ represents a hydrogen atom, lower alkyl, phenyl, lower alkoxy or benzyloxy, to a hydrolysis or a catalytic reduction in the presence of a noble metal catalyst selected from the group consisting of nickel, palladium and platinum in the presence of a solvent selected from the group consisting of alcohol, ether, acetic acid and ethyl acetate to produce the corresponding 2-aminoindole derivative represented by the formula wherein $R_1$, $R_2$, $R_3$ and $R_4$ are as defined above, and reacting the 2-aminoindole derivative thus produced with an oxidizing agent selected from the group consisting of ozone and potassium hydroxide-bromine in an inert solvent.

4. A process according to claim 3 wherein said hydrolysis is carried out by an alkali hydrolysis in the presence of a caustic alkali or an acid hydrolysis in the presence of a mineral acid.

5. A process according to claim 3 wherein said catalytic reduction is carried out in the presence of a noble metal catalyst selected from the group consisting of palladium or platinum.

6. A process according to claim 3 wherein said solvent for the catalytic reduction is ethanol.

7. A process according to claim 3 wherein said inert solvent is selected from the group consisting of water, chloroform, carbon tetrachloride, acetic acid, formic acid, acetone, tetrahydrofuran and alcohols.

* * * * *